United States Patent [19]
Wissmann et al.

[11] Patent Number: 4,867,270
[45] Date of Patent: Sep. 19, 1989

[54] EXHAUST GAS MUFFLER FOR A TWO-STROKE ENGINE

[75] Inventors: Michael Wissmann, Schorndorf-Weiler; Jürgen Grassmuck, Stuttgart; Wilfried Müller, Mannenberg; Helmut Zimmermann, Waiblingen, all of Fed. Rep. of Germany

[73] Assignee: Andreas Stihl, Waiblingen, Fed. Rep. of Germany

[21] Appl. No.: 258,729

[22] Filed: Oct. 17, 1988

[30] Foreign Application Priority Data

Dec. 8, 1987 [DE] Fed. Rep. of Germany ....... 3741426
Sep. 1, 1988 [DE] Fed. Rep. of Germany ....... 3829668

[51] Int. Cl.⁴ .......................... F01N 3/15; F01N 1/14
[52] U.S. Cl. ................................ 181/231; 181/240; 181/256; 181/258; 181/262; 181/269; 181/282; 55/DIG. 30; 60/302; 60/314; 60/317

[58] Field of Search .............. 181/230, 231, 252, 256, 181/258, 269, 240, 262, 272, 282; 55/276, DIG. 21, DIG. 30; 60/299, 302, 317, 320, 314

[56] References Cited

U.S. PATENT DOCUMENTS

| | | | |
|---|---|---|---|
| 3,644,098 | 2/1972 | DePalma et al. | 60/302 X |
| 4,060,985 | 12/1977 | Fukushima | 60/320 X |
| 4,370,855 | 2/1983 | Tuggle | 60/320 X |

Primary Examiner—B. R. Fuller
Attorney, Agent, or Firm—Walter Ottesen

[57] ABSTRACT

The invention relates to an exhaust gas muffler for a two-stroke engine of a portable handheld tool such as a chain saw. The exhaust gas muffler includes a catalyzer wherein high exhaust gas temperatures are developed because of the exothermal reaction which takes place therein. The catalyzer is located in the forward portion of a gas-tight hollow body mounted in the housing of the muffler. The hollow body has a tapered portion which extends out of the housing in the direction of the exhaust gas flow. In this way, the surface temperature of the muffler housing is reduced.

28 Claims, 7 Drawing Sheets

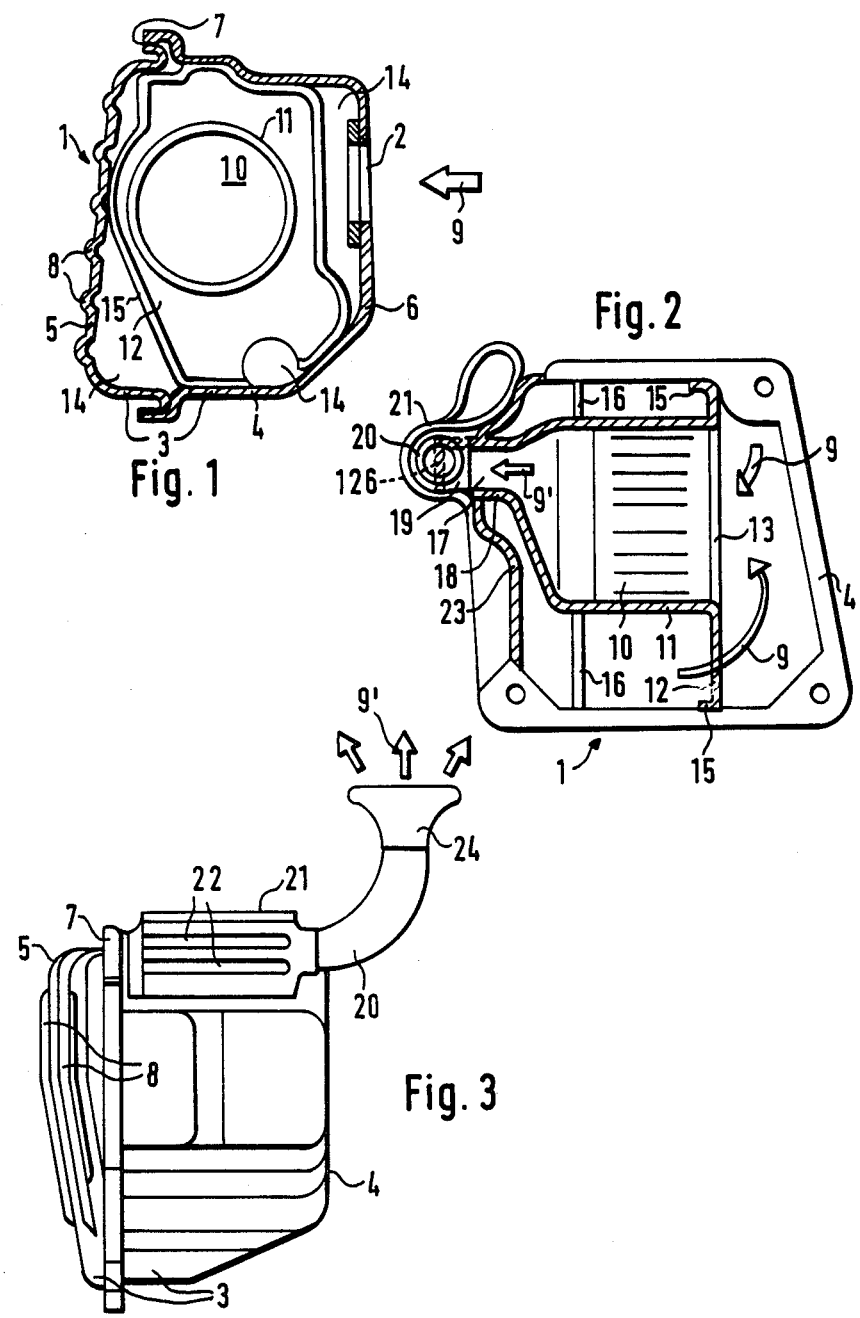

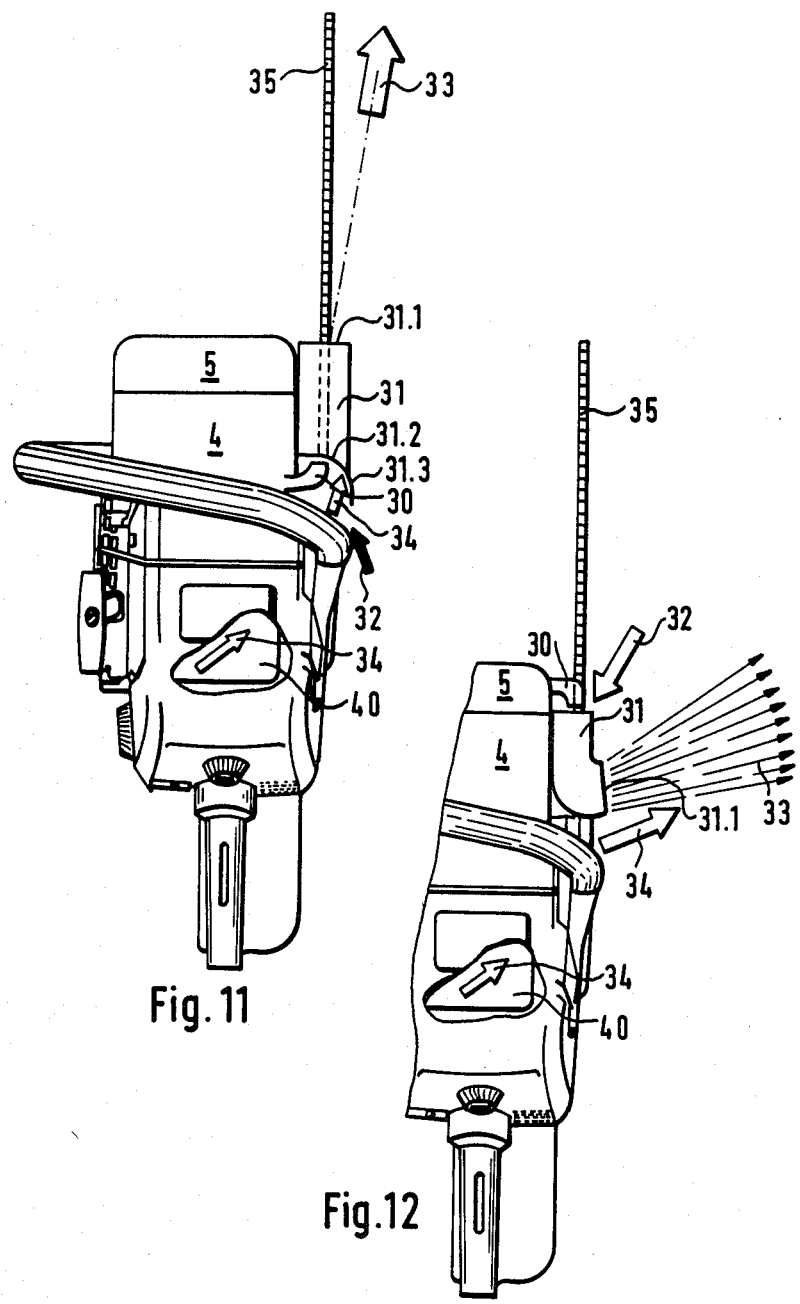

EXHAUST GAS MUFFLER FOR A TWO-STROKE ENGINE

FIELD OF THE INVENTION

The invention relates to an exhaust gas muffler for a two-strike engine and especially for portable handheld tools such as chain saws or the like. The exhaust gas muffler includes a housing and a catalyzer.

BACKGROUND OF THE INVENTION

In chain saws driven by two-stroke engines, the exhaust gases discharged from the cylinder reach the muffler with a temperature of approximately 600° C. Through the chemical conversion process in the catalyzer wherein hydrocarbons are converted to carbon dioxide and water, the temperature can increase to approximately 1,000° C. because this conversion process is exothermal. The scavenging losses which are typical for a two-stroke engine cause energy-rich exhaust gases to be available for the conversion process so that during this conversion process heat energy is released which corresponds approximately to the energy delivered by the engine.

In practice, it has been shown that an ignition of the treated exhaust gases can occur because of the energy-rich exhaust gases typical for the two-stroke engine and because of the temperature increase brought about by the conversion process.

SUMMARY OF THE INVENTION

It is an object of the invention to provide an exhaust gas muffler which prevents an ignition of the treated exhaust gases which leave the catalyzer and thereby prevent operating personnel from becoming endangered by these exhaust gases.

According to a feature of the invention, the catalyzer is arranged in a hollow body mounted in the muffler housing so as to be in spaced relationship on all sides with respect to the housing wall. For this reason, the untreated exhaust gas passes over a large portion of the peripheral surface of the hollow body whereby a cooling of the hollow body is made possible. The hot exhaust gas does not self-ignite because of the length and tapered cross section of the output portion of the hollow body in the direction of flow.

In an advantageous further embodiment of the invention, the exhaust gas output pipe is partially circular and arranged about the hollow body so as to cause the untreated exhaust gas to pass over the output pipe so that all parts which conduct the treated exhaust gas are additionally cooled by the untreated exhaust gas thereby obtaining a lower surface temperature.

In order to reduce the temperature of the treated exhaust gas, it is further provided that the outlet section of the exhaust gas output pipe is configured as a nozzle and arranged opposite the input of a jet pipe so that the exhaust gas flowing into the jet pipe draws cool ambient air into this jet pipe and becomes mixed therewith to exit as a mixed gas flow of reduced temperature. The input of the jet pipe has a substantially greater cross section than the nozzle.

BRIEF DESCRIPTION OF THE DRAWINGS

The invention will now be described with reference to the drawings wherein:

FIG. 1 is a side elevation view, in section, of an embodiment of the exhaust gas muffler according to the invention;

FIG. 2 is a side elevation view, in section, of the muffler of FIG. 1;

FIG. 3 is a plan view of the muffler of FIG. 1;

FIG. 11 is a plan view of a motor-driven chain saw showing a laterally mounted jet pipe with the mixed gas flow exiting in the longitudinal direction;

FIG. 12 is a plan view of the motor-driven chain saw of FIG. 11 with a laterally mounted jet pipe having an outlet directed transversely to the longitudinal axis of the chain saw;

DESCRIPTION OF THE PREFERRED EMBODIMENTS OF THE INVENTION

Figure 4:
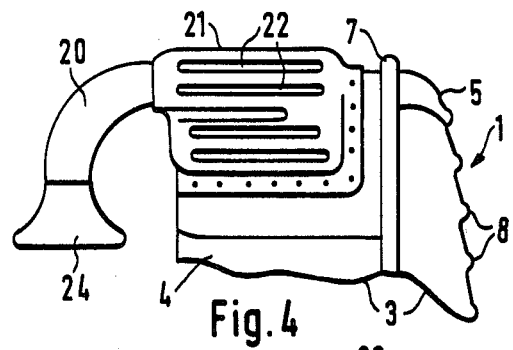
FIG. 4 is a side elevation view, in section, of another embodiment of the muffler according to the invention.

The exhaust gas muffler shown in the drawings is for a two-stroke engine of a portable handheld tool such as a chain saw. The muffler 1 is mounted tightly against the two-stroke engine. The muffler has an exhaust gas input which is directly connected to a support or flange of the engine cylinder. Through this exhaust gas input 2, the exhaust gas discharged from the engine is directed into the muffler.

The housing 3 of the exhaust gas muffler is made of a shell-shaped housing part 4 designated as the lower shell and a housing shell 5 connected with the lower shell. The housing shell 5 is designated as the upper shell. The lower shell 4 has a wall 6 in which the exhaust gas input 2 is formed. The lower shell 4 faces toward the engine cylinder while the upper shell 5 faces away from the cylinder. The lower shell 4 and the upper shell 5 are made deep-drawn parts and are connected with each other at partition interface plane 7. The gas-tight connection of both shells is advantageously achieved by flanges which are releasably connected together with threaded fasteners. It can be advantageous to permanently connect the shells 4 and 5 with each other at the interface plane 7, for example, by means of lock-seaming or welding.

Figure 6:
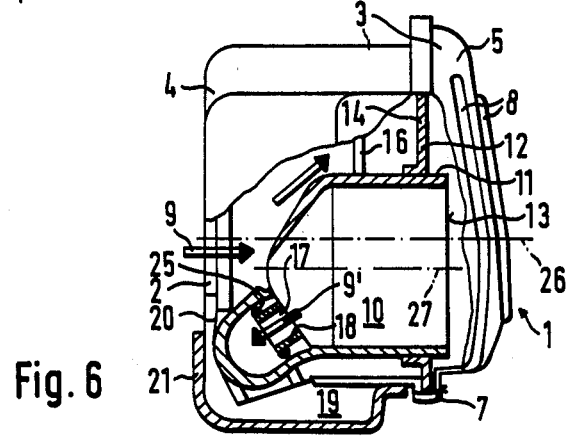
FIG. 6 is a plan view of the muffler of FIG. 4 with a portion of the outer wall broken away to show the interior thereof.
Figure 8:
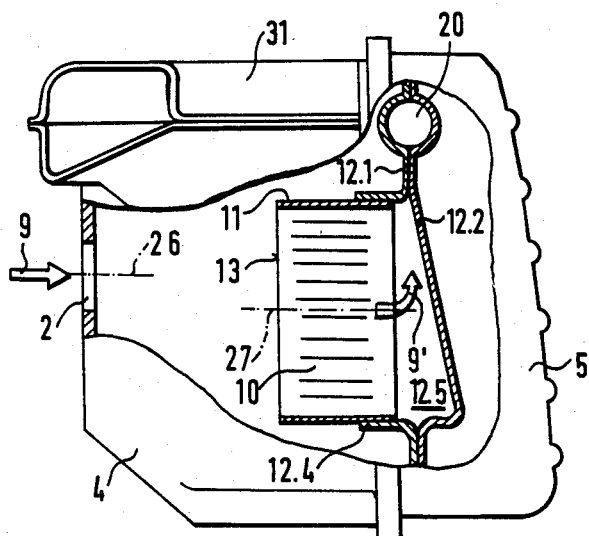
FIG. 8 is a side elevation view of the muffler of FIG. 7 with a portion of the outer wall broken away and with the interior elements shown in section.

In the embodiments of FIGS. 1, 6 and 8, the upper shell 5 is formed to a depth less than the lower shell 4 and has profiled impressions 8 for increasing the strength and enlarging the wall surface.

Figure 7:
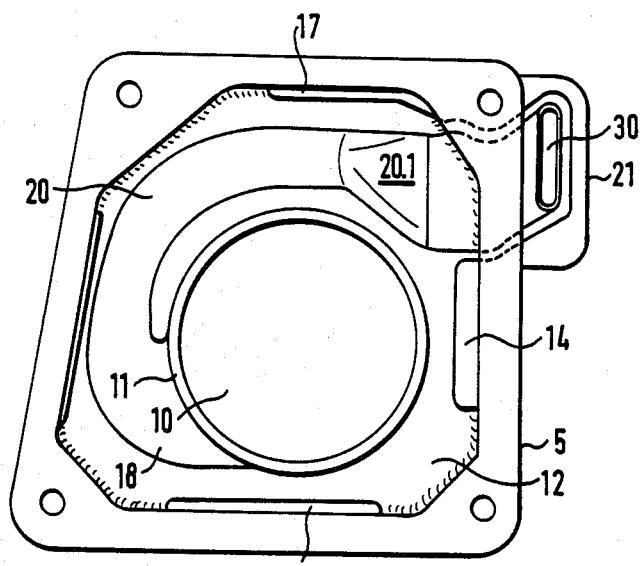
FIG. 7 is an elevation view taken at the interface plane of a third embodiment of the exhaust gas muffler according to the invention.

A catalyzer 10 is provided in the housing 3 for cleaning the exhaust gas 9 flowing from the engine into the muffler 1. The catalyzer 10 is mounted in a hollow body 11 which preferably has a tubular shape. The hollow body 11 is held at one end in a receiving plate 12 which is preferably retained in the lower shell 4 of the housing 3. The receiving plate 12 is braced with an edge 15 in the lower shell 4. The receiving plate 12 can be formed so that it is releasably held in the lower shell 4 without further attachment means as shown in FIG. 1. It can also be advantageous to permanently attach plate 12 by means of welding or soldering the edge 15 in a housing part as shown in FIGS. 7 and 8.

The hollow body 11 is additionally secured in the lower shell 4 at its forward end by means of supporting struts 16 as shown in FIGS. 2 and 6. With this additional support, a holding of the hollow body 11 which is substantially free of vibration is assured even at high loads. The supporting struts 16 can, for example, be welded and also afford an additional reinforcement and stiffening of the housing 3.

The hollow body 11 is disposed in the housing 3 so as to be spaced from the housing wall on all sides and holds the catalyzer 10 therein. In the embodiment shown, the hollow body 11 lies transversely to the exhaust gas input 2 such that the incoming exhaust gas 9 impinges on the outer surface of the tubular hollow body 11. Since the temperature of the entering exhaust gas 9 is less than the temperature developed in the catalyzer 10 (approximately 1,000° C.), the catalyzer is intensively cooled by the entering exhaust gas 9 over its entire periphery. Pass-through openings 14 between the housing wall and the edge 15 of the receiving plate 12 as shown in FIG. 1 assure that the entering exhaust gas 9 passes through to the input 13 (FIG. 2) of the catalyzer 10.

The output 17 of the tubular hollow body 11 lying opposite the input 13 is configured as a tubular portion 18 having a tapering cross section. The diameter of the tubular portion 18 is substantially less than that of the hollow body 11. Preferably, the diameter of the tubular portion 18 is less than half of the diameter of the hollow body 11.

The free end of the tubular portion 18 is arranged so that it is gas-tight in the wall of the lower shell 4 and opens into an exhaust gas chamber 19 which is formed between the outer wall of the lower shell 4 and a hood 21 seated on the outer wall of the lower shell 4 as shown in FIGS. 1 to 3. Preferably, the hood 21 is welded gas-tight with the wall 6 of the lower shell 4. The hood 21 is advantageously made of sheet metal and is provided with ribs or creases 22 thereby providing an enlarged surface for obtaining an intensive dissipation of heat.

An exhaust gas pipe 20 is connected in a gas-tight manner to the exhaust gas chamber 19. The exhaust gas pipe 20 is preferably mounted on the end face of the exhaust gas chamber 19 facing away from the upper shell 5 as shown in FIG. 3.

Figure 5:
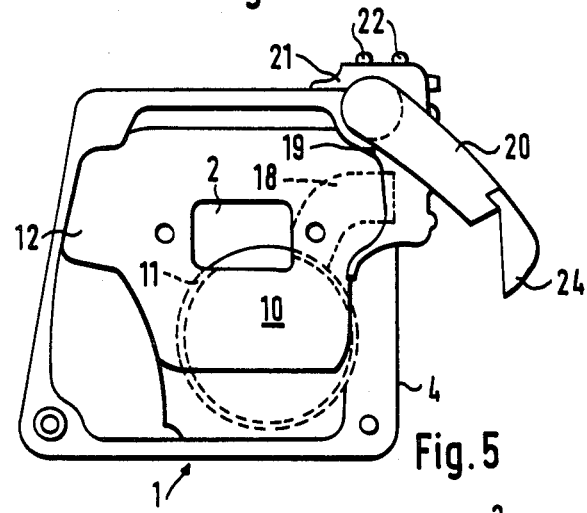
FIG. 5 is a section view of the muffler of FIG. 4.

The exhaust gas flowing through the exhaust gas inlet 2 passes through the pass-through openings 14 (FIG. 1) to the input 13 (FIG. 2) of the catalyzer 10. Thereafter, the exhaust gas flows through the catalyzer 10 and passes as a treated exhaust gas 9' into the exhaust gas chamber 19 at the output 17 which is reduced in diameter. From the exhaust gas chamber 19, the treated exhaust gas 9' flows through the exhaust gas output pipe 20 to the outlet at which a deflector wall 24 is advantageously mounted as shown in FIGS. 3 to 5.

This deflector wall is configured approximately in the shape of a duck bill in order to distribute the outflowing gas in a fan-like manner. By means of the deflector wall 24, the treated exhaust gas 9' can be directed away in a wide fan-shaped distribution with a direct impingement upon the engine housing being prevented. Also, an impingement of the treated gas 9' onto the sprocket wheel cover or other parts of the chain saw is prevented.

Inflowing untreated exhaust gas flows over the hollow body 11 from the input 13 to the output 17 because of the configuration provided by the invention whereby a cooling of the catalyzer results. In this way, a temperature is obtained at the housing 3 which is significantly less than the temperature at the wall of the hollow body 11. The receiving plate 12 and the supporting struts 16 should have the smallest cross section possible in order to obtain a low heat transfer to the housing via these members.

For obtaining the longest possible flow path of the treated exhaust gas 9', a partition wall 126 can be provided in the exhaust gas chamber 19 which separates two exhaust gas channels connected one behind the other in the direction of flow. The treated gas 9' flows through these exhaust gas channels, for example, in opposite directions to the exhaust gas output pipe 20 which is advantageously welded inside to the hood 21.

In the embodiment shown in FIGS. 4 to 6, the hollow body 11 holding the catalyzer 10 is aligned axially to the exhaust gas input 2. Preferably, the center axis 26 of the exhaust gas input 2 is approximately parallel to the center axis 27 of the hollow body 11 carrying the catalyzer 10. As in the embodiments of FIGS. 1 to 3, the hollow body 11 is disposed in a plate-shaped receptacle 12 which is fixed in position in the housing interface plane 7 in the embodiments of FIGS. 4 to 6. For this purpose, the plate-like receptacle 12 is disposed with its peripheral edge portions between the attachment flanges of the lower shell 4 and the upper shell 5 which are releasably joined preferably by threaded fasteners. The input 13 of the catalyzer is disposed in the upper shell on the side of the plate-like receptacle 12 facing away from the exhaust gas inlet 2. The untreated exhaust gas flowing through the exhaust gas inlet 2 flows through pass-through openings 14 to the input 13 and cools the hollow body 11 on its path to the input 13. The pass-through openings 14 are formed in the plate-like receptacle 12.

The hollow body 11 tapers in the direction of flow of the exhaust gases and ends in a pipe stub 18 which forms the outlet 17 of the catalyzer 10 and which has a greatly reduced diameter. In the illustrated embodiment, the pipe stub 18 opens directly into the exhaust gas output pipe 20 which is connected directly at the pipe stub 18. The pipe stub 18 is preferably made as a spherical segment or the like to compensate for tolerances and deformations. The pipe stub 18 is sealed in the exhaust gas output pipe 20 by means of a seal 25 so that the treated exhaust gas 9' can not flow away in an uncontrolled manner. The seal 25 is preferably an elastic ring by means of which an additional tolerance compensation is possible.

The releasable connection of the hollow body 11 with the exhaust gas output pipe 20 is advantageously located within the housing 3. In this way, the situation is prevented whereby oxygen can be present at the output end of the catalyzer 10 because of the occurrence of small leaks. The oxygen could then otherwise lead to an igniting of the treated exhaust gas 9'. For leaks which occur within the housing 3, only a minimal bypass can arise through which untreated exhaust gas 9 can enter and which, however, can not substantially affect the function of the catalytic muffler.

The exhaust gas output pipe 20 extends out from the space 19 formed by the hood 21 as shown in FIG. 5 and ends at a deflector wall 24 which provides a fan-like outflow of the exhaust gas.

Since the temperature of the inflowing exhaust gas 9 is approximately 600° C. and the treated exhaust gas 9' has a temperature of from 900° to 1,000° C., the arrangement according to the invention of the catalyzer arranged within the housing 3 achieves a cooling of the treated outflowing exhaust gas flow 9' by means of the entering exhaust gas flow 9 whereby the possibility of the ignition of the treated exhaust gas 9' is reduced.

In the embodiment of FIGS. 7 and 8, the exhaust gas output pipe 20 is mounted in the muffler housing 3 and is led out of the upper shell 5 of the muffler housing only with its widened outlet portion 20.1. As shown in the plan views of FIGS. 7 and 9, the exhaust gas output pipe 20 is curved to approximate the portion of a circle and extends around the hollow body 11 of the catalyzer 10 as shown. The output pipe 20 preferably extends over approximately a quarter of the periphery of the hollow body 11 in spaced relationship thereto. The exhaust gas output pipe 20 is further mounted so that it is in spaced relationship on all sides to the muffler housing 3.

The exhaust gas output pipe joins as one piece the pipe portion 18 at the output of the catalyzer 10. The pipe portion 18, the exhaust gas output pipe 20 as well as the plate-shaped receptacle 12 are assembled from two profiled plates 12.1 and 12.2 as shown in detail in FIGS. 9 and 10. In each plate, the half shell of a spirally-shaped exhaust gas output pipe 20 as well as the pipe portion 18 are formed and joined to one another at the partition interface plane 12.3. The holder 12.4 for the hollow body 11 with the catalyzer 10 is provided in the plate 12.1 in which the hollow body 11 is firmly mounted in a gas-tight manner. The plate-shaped receptacle 12 is firmly positioned with its edge in the upper shell 5 and is preferably welded in place whereby the hollow body 11 with the catalyzer 10 and the exhaust gas output pipe is fixedly positioned in the upper shell 5. The upper shell 5 is a housing part which faces away from the engine cylinder 40. A defective catalyzer can be exchanged for a new one by exchanging the upper shell 5. On the other hand, an old muffler can be provided with a catalyzer 10.

The hollow body 11 with the catalyzer 10 is axially aligned to the exhaust gas input 2 with the input 13 of the catalyzer facing the exhaust gas input 2 as shown in FIG. 8. Inflowing exhaust gas enters into the catalyzer 10 and is treated and then passes as a treated exhaust gas flow 9' through the pipe portion 18 and the exhaust gas output pipe 20 to the outlet portion 20.1 of the exhaust gas output pipe 20. This outlet portion 20.1 has a widened configuration and terminates in a nozzle 30 bent over at an angle of 90°. The significance of the nozzle 30 will be discussed below.

Figure 9:
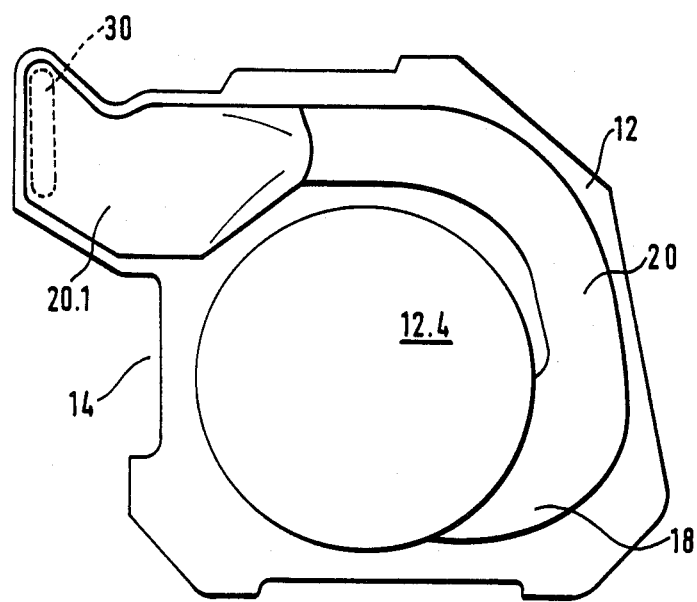
FIG. 9 is a rear view of the plate-like receptacle for accommodating the hollow body of the catalyzer.
Figure 10:
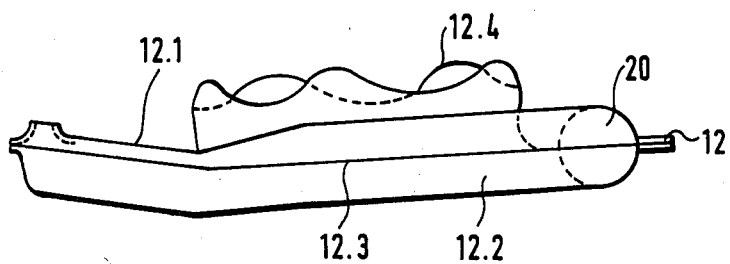
FIG. 10 is a plan view of the receptacle of FIG. 9.

As shown in FIGS. 9 and 10, the widened outlet portion 20.1 of the exhaust gas output pipe 20 as well as the outlet nozzle 30 are formed in the plates 12.1 and 12.2. In this way, the following are all formed in a single unit: the nozzle 30, the exhaust gas output pipe 20, the plate-shaped receptacle 12 and the holder 12.4 provided for the hollow body 11 of the catalyzer 10. It can be advantageous to configure the hollow body 11 as a single unit with the plate 12.2 or the receptacle 12.

As shown in FIGS. 8 and 9, a gas chamber 12.5 for the treated exhaust gas is formed behind the receptacle 12.4. The exhaust gas chamber 12.5 is bounded by the plates of the receptacle 12. The formed pipe portion 18 leads into the exhaust gas output pipe 20 approximately radially to axis 27 of the catalyzer. The exhaust gas output pipe should have a minimum length of 85 mm for a maximum diameter of 13 mm. In practice, it has been surprisingly shown that the ignition of the treated exhaust gas 9' is prevented with a configuration of this kind. By means of the arrangement of the exhaust gas output pipe 20 within the housing 3, untreated exhaust gas 9 entering via the pass-through openings 14 in the plate-shaped receptacle 12 flows over the output pipe 20 along its entire length so that the exhaust gas flow 9' exiting from the catalyzer at approximately 900° to 1,000° C. is greatly cooled down by the untreated exhaust gas having a temperature of approximately 600° C. The treated exhaust gas flow therefore has a significantly lower temperature at the output of the nozzle 30 than directly at the output of the catalyzer 10. In addition, the cooling of the exhaust gas flow operates to reduce the possibility of an igniting of the treated exhaust gas 9'.

In order to obtain a further cooling of the exhaust gas flow 9' exiting from the nozzle 30, a jet pipe 31 is arranged so that it lies opposite the nozzle 30 and has an inlet cross section 31.2 which is a multiple greater than the outlet cross section of the nozzle.

As shown in FIG. 12, the nozzle 30 is arranged with respect to the jet pipe 31 in the manner of an injector so that the treated exhaust gas 9' entering the jet pipe 31 draws in cool ambient air 32 whereby a gas mixture 33 is obtained which is blown out laterally. This gas mixture 33 is blown out in a wide fan-like manner transversely to the longitudinal direction of the chain saw and has a greatly reduced exhaust gas temperature. The gas mixture 33 is advantageously blown out in the same direction as the engine cooling air 34 exits. The two flows can mix whereby a further reduction of the temperature in the region of the outlet 31.1 of the jet pipe 31 is obtained. This injection arrangement can be utilized in its own right separate from the other measures described herein as a measure for reducing the temperature of the exhaust gas flow.

In the embodiment of FIG. 12, the nozzle 30 is provided on the upper shell 5 of the two-shell muffler housing 3 as shown for the embodiment according to FIGS. 7 and 8. The jet pipe 31 is attached to the lower shell 4 or can be formed on the lower shell 4. It can advantageously include two juxtaposed half shells which then form the jet pipe. The mixed gas leaves the outlet 31.1 transversely to the longitudinal axis of the chain saw defined by the guide bar 35. This arrangement requires only very little construction space so that even older chain saws can be equipped with a catalyzer by means of an exchange of mufflers.

In the embodiment of FIG. 11, the nozzle 30 extends out from the lower shell 4 and is disposed adjacent a jet pipe 31 which is preferably likewise attached to the lower shell 4. The output 31.1 of the jet pipe 31 is arranged in the longitudinal direction of the guide bar 35. The input 31.2 of the jet pipe 31 is provided with a lateral catch plate 31.3 for directing at least a portion of the engine cooling air 34 into the jet pipe 31. The entering engine cooling air 34 augments the injection effect of the combination of the nozzle 30 and the jet pipe 31 so that adequate ambient air 32 is drawn in by suction for cooling the exhaust gas flow 9'.

Figure 13:
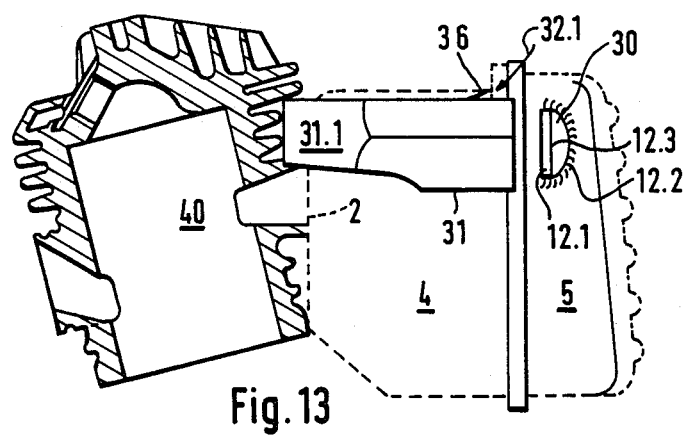
FIG. 13 is a schematic showing a side elevation view, partially in section, of the engine cylinder with the muffler mounted thereon as shown in FIG. 12.
Figure 14:
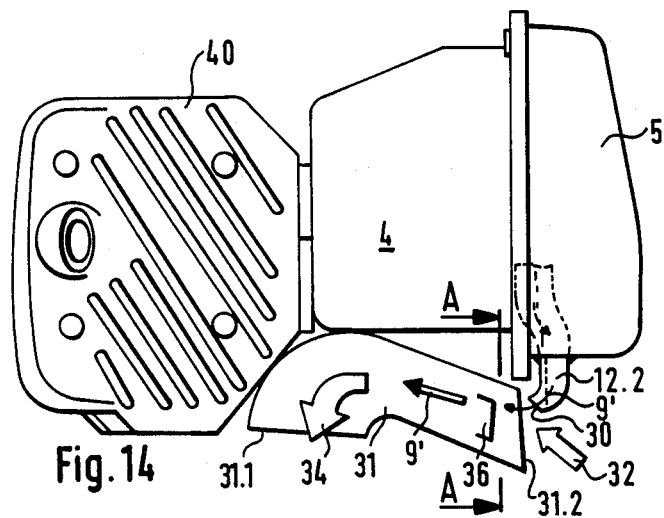
FIG. 14 is a plan view of the muffler of FIG. 13.

The embodiment shown in FIG. 12 is shown enlarged in FIGS. 13 and 14. The nozzle 30 is formed by joining the plates 12.1 and 12.2 together as shown in FIG. 10 with the plates forming the receptacle 12. The nozzle 30 extends laterally out of the upper shell 5 as shown in FIG. 14 and is welded to the latter in a gas-tight manner. The nozzle 30 lies opposite the input 31.2 of the jet pipe 31 which is disposed laterally next to the lower shell 4 and is preferably attached to the latter. The incoming exhaust gas flow 9' draws cold ambient air 32 into the jet pipe 31 and becomes mixed therewith. In this way, the exiting mixed gas flow 34 has a markedly lower temperature than the exhaust gas flow 9'.

For augmenting the suction action, one or more gill-like air openings 36 can be provided which are formed in the wall of the jet pipe. Further cooling ambient air 32.1 (FIG. 13) flows in through these openings 36 and this cool ambient air drops the temperature of the exiting mixed gas flow 34.

Figure 15:
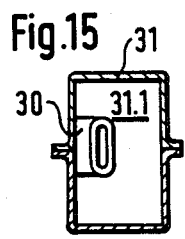
FIG. 15 is a section view of the exhaust pipe taken along line A—A of FIG. 14.
Figure 16:
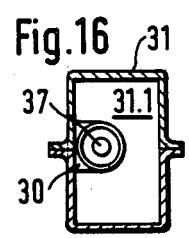
FIG. 16 is a section view corresponding to that of FIG. 15 wherein the exhaust pipe includes a circular nozzle.

In the embodiment of FIG. 7, the nozzle 30 has an exit cross section which is essentially rectangular with curved corners as shown in FIG. 15. The outlet cross section of the nozzle 30 can however advantageously be a circular outlet cross section with a central core 37 as shown in FIG. 16.

Figure 17:
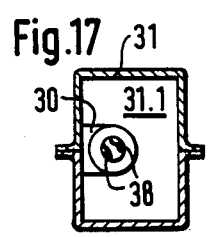
FIG. 17 is a section view corresponding to FIG. 15 with the nozzle configured as a swirl nozzle.

In lieu of the core 37, it can be advantageous to provide a swirl plate 38 for a round nozzle cross section as shown in FIG. 17. This configuration provides an improved turbulence of the treated exhaust gas flow 9' with the entering cooler ambient air 32.

Figure 18:
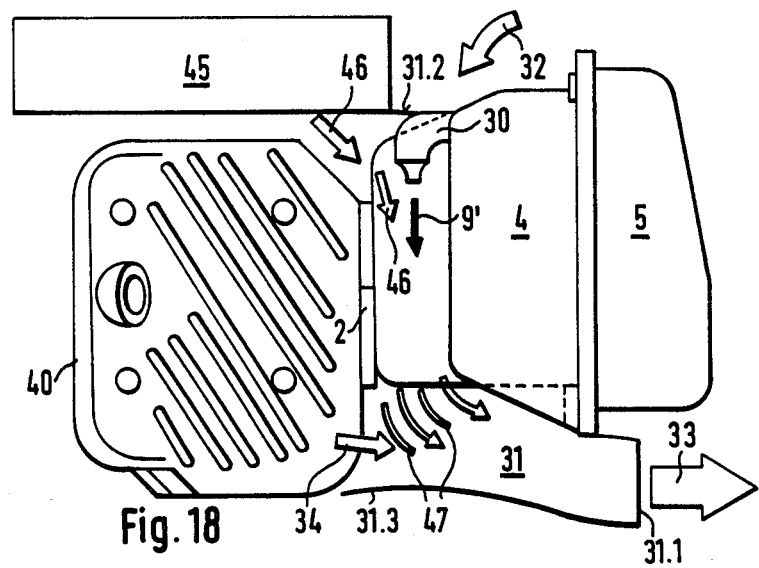
FIG. 18 is a schematic plan view of an embodiment of the exhaust gas muffler of the invention equipped with a jet pipe; and, FIG. 19 is a schematic plan view of an embodiment of the exhaust gas muffler of the invention equipped with another jet pipe.
Figure 19:
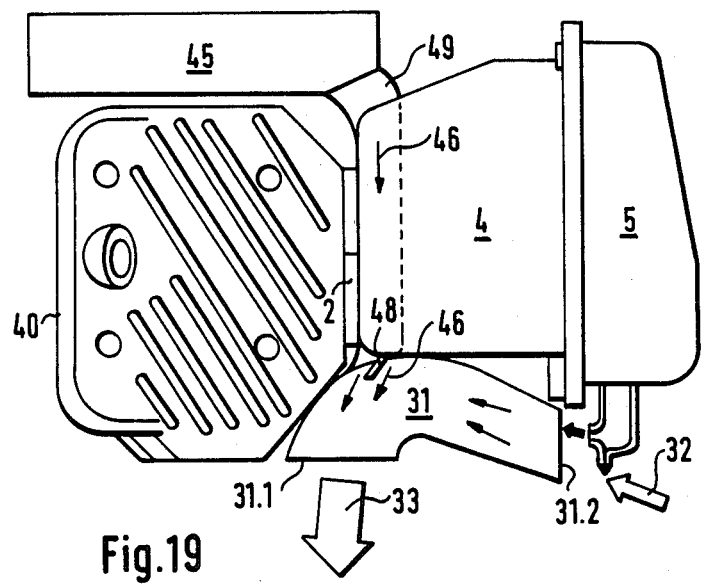

In a further embodiment of the invention as shown in FIGS. 18 and 19, a component air flow 46 of the engine cooling fan 45 is guided into the jet pipe 31 to augment the injection action in the jet pipe 31. This component air flow 46 can be introduced into the jet pipe 31 directly with the treated exhaust gas flow 9' at the elevation of the nozzle 30 as shown in FIG. 18. The jet pipe 31 is extended above the exhaust gas input 2 in the direction toward the nozzle 30. The nozzle 30 is provided on the side of the muffler housing 3 facing away from the jet pipe. The jet pipe 31 therefore has an approximately L-shape. In the region of the deflection of the flow, slightly bent guide vanes 37 are mounted and extend in the direction of the flow. At the elevation of the vanes, additional engine cooling air is drawn in in the flow direction of the jet pipe for which the latter is provided with a catch plate 31.3 as shown in FIG. 11. The cooling ambient air 32 flows toward the jet pipe 31 at the input 31.2 because of the injection action.

In the embodiment of FIG. 19, the jet pipe 31 is provided in the manner corresponding to the embodiments shown in FIGS. 8, 12 and 14. The jet pipe 31 is mounted so that its opening 31.2 faces toward the upper shell 5. Preferably, the inlet 31.2 is at the elevation of the interface plane 7. In the flow direction of the entering gas, the jet pipe 31 extends diagonally in the direction toward the exhaust gas inlet 2 of the muffler housing and is bent outwardly at the elevation of the exhaust gas inlet 2 so that the mixed gas 33 flows away laterally as shown in FIG. 12. The mixed gas outlet 31.1 is disposed approximately at the contour of the cylinder 40 when seen in plan view so that the outer contour of the cylinder 40 with the muffler housing 3 flange-attached thereto is hardly overlapped by the jet pipe 31 attached to the lower shell 4.

An air channel 49 is supplied by the engine cooling fan and opens into the jet pipe 31 at approximately the elevation of the bend. At least one guide plate 48 is advantageously provided in the region where the air channel 49 opens into the jet pipe 31. The inflowing component air flow 46 of the fan 45 increases the flow into the jet pipe 31 whereby additional cool ambient air 32 is drawn in by suction. The housing parts of the chain saw surrounding the exhaust gas muffler 1 can be advantageously protected against heat by means of a heat-protective foil. Furthermore, the muffler 1 can be provided with additional equipment (not shown) for providing heat insulation at the attachment points. This additional equipment can be made of poorly heat conductive insulation material and can be formed from discs or angular-shaped spacer pieces.

It is understood that the foregoing description is that of the preferred embodiments of the invention and that various changes and modifications may be made thereto without departing from the spirit and scope of the invention as defined in the appended claims.

What is claimed is:

1. An exhaust gas muffler for a two-stroke engine, especially for a handheld portable tool such as a chain saw, the engine including a cylinder and a piston conjointly defining a combustion chamber wherein combustion gases are generated and discharged as a flow of exhaust gas during operation of the engine, the exhaust gas muffler comprising:

a housing having an inner housing wall surface defining an interior space;

a hollow body having an outer body wall surface and an inlet opening for receiving the exhaust gas;

mounting means for mounting said hollow body in said interior space so as to cause said outer body wall surface to be in spaced relationship to said inner housing wall surface on all sides of said hollow body;

a catalyzer mounted in said hollow body for exothermally converting the exhaust gas to form treated exhaust gas;

said hollow body having an outlet portion downstream of said catalyzer and said inlet opening, said outlet portion terminating in an outlet opening through which said treated exhaust gas leaves the hollow body to flow out from said housing; and, said outlet portion of said hollow body being configured to have a cross section less than the remaining portion thereof.

2. The exhaust gas muffler of claim 1, the treated exhaust gas flowing in a direction from said catalyzer into and through said outlet portion, and, said hollow body having a cross section and said outlet portion of said hollow body having a tapered configuration over a predetermined length thereof so as to cause the cross section of said hollow body to become less and less over said length in the direction of flow of the treated exhaust gas.

3. The exhaust gas muffler of claim 2, said housing having an exhaust gas chamber having first and second ends; said exhaust gas chamber being formed in said housing so as to cause said first end to communicate with said outlet opening of said hollow body; and, an exhaust gas output pipe connected to said second end for conducting the treated exhaust gas into the ambient.

4. The exhaust gas muffler of claim 3, said exhaust gas chamber being partitioned into at least two channels connected in series between said outlet opening of said hollow body and said exhaust gas output pipe.

5. The exhaust gas muffler of claim 4, said housing having an outer housing wall surface and a hood mounted gas-tight on said outer housing wall surface so as to enclose a portion of said outer housing wall surface to conjointly define said exhaust gas chamber therewith.

6. The exhaust gas muffler of claim 1, comprising: an exhaust gas output pipe communicating directly with said outlet opening of said hollow body; and, said exhaust gas output pipe being mounted on said housing so as to extend outwardly therefrom in a gas-tight manner.

7. The exhaust gas muffler of claim 6, said exhaust gas output pipe having an inner wall surface; said outlet portion including a pipe piece defining said outlet opening; said pipe piece having an outer peripheral surface adjacent the inner wall surface of said output pipe and being releasably connected to said output pipe; and, sealing means for sealing the outer peripheral surface of said pipe piece with respect to the inner wall surface of said output pipe.

8. The exhaust gas muffler of claim 7, said pipe piece and said output pipe conjointly defining an interface at which said pipe piece is releasably connected to said outlet pipe; and, said pipe piece being configured as a spherical segment for contact engaging said output pip for compensating for tolerances and deformations at the interface of said pipe piece and said output pipe.

9. The exhaust gas muffler of claim 8, said outlet portion including a pipe piece defining said outlet opening and opening into said output pipe inside of said housing.

10. The exhaust gas muffler of claim 9, said output pipe being mounted inside of said housing.

11. The exhaust gas muffler of claim 10, said output pipe having a predetermined length and being shaped along said length so as to correspond to a portion of the circumference of a circle; and, said output pipe being mounted in said housing so as to be disposed in spaced relationship to said hollow body.

12. The exhaust gas muffler of claim 11, said output pipe having a maximum diameter of 13 mm and a minimum length of 85 mm.

13. The exhaust gas muffler of claim 11, said output pipe and said pipe piece being configured as a single part.

14. The exhaust gas muffler of claim 6, said mounting means being a plate-like receptacle for mounting said hollow body in said housing.

15. The exhaust gas muffler of claim 14, said plate-like receptacle extending across said interior space and having cutouts formed therein to permit the exhaust gas discharged from the engine to pass therethrough.

16. The exhaust gas muffler of claim 15, said mounting means including releasable attachment means for releasably attaching said plate-like receptacle to said housing.

17. The exhaust gas muffler of claim 16, said housing comprising two shell parts conjointly defining a partition interface, said plate-like receptacle being fixedly clamped between said shell parts at said partition interface.

18. The exhaust gas muffler of claim 1, said hollow body defining a longitudinal axis, said housing having a housing inlet for admitting the exhaust gas of said engine into said interior thereof in a predetermined direction of flow; said housing inlet defining a housing inlet axis extending in the direction of the inflowing exhaust gas; and, said mounting means being arranged in said housing for mounting said hollow body so as to place said longitudinal axis thereof transversely to said housing inlet axis.

19. The exhaust gas muffler of claim 1, said hollow body defining a longitudinal axis, said housing having a housing inlet for admitting the exhaust gas of said engine into said interior thereof, said housing inlet defining a housing inlet axis extending in the direction of the inflowing exhaust gas; and, said mounting means being arranged in said housing for mounting said hollow body so as to place said longitudinal axis thereof so that the latter said hollow body extends in the same direction as long said inlet axis.

20. The exhaust gas muffler of claim 19, said housing having a back wall lying opposite said housing inlet opening; said hollow body being mounted in said housing so as to cause said inlet opening of said hollow body to face toward said back wall.

21. The exhaust gas muffler of claim 19, said housing having a front wall and said housing inlet opening being formed in said front wall, said hollow body being mounted in said housing so as to cause said inlet opening of said hollow body to face toward said front wall.

22. The exhaust gas muffler of claim 21, comprising: an exhaust gas output pipe mounted in said housing and communicating with said outlet opening of said hollow body; said housing including two shell parts conjointly defining a partition interface at which said shell parts are joined to define said housing; one of said shell parts facing away from said engine; and, said outlet portion of said hollow body and said exhaust gas output pipe being mounted on said one shell part.

23. The exhaust gas muffler of claim 1, comprising: an exhaust gas output pipe mounted in said housing and communicating with said outlet opening of said hollow body; said output pipe having an output end and having nozzle means formed at said output end; and, a jet pipe mounted on the portable tool and having a jet pipe opening arranged adjacent said nozzle means so that the treated exhaust gases flow into and through said jet pipe in a predetermined flow direction; said nozzle means defining a nozzle opening having a predetermined cross-sectional area; and, said jet pipe opening having a cross-sectional area greater than said cross-sectional area of said nozzle opening.

24. The exhaust gas muffler of claim 23, said housing including two shell parts conjointly defining a partition interface at which said shell parts are joined to define said housing; one of said shell parts facing toward said engine; and, said jet pipe being mounted on said one shell part.

25. The exhaust gas muffler of claim 23, said housing including two shell parts conjointly defining a partition interface at which said shell parts are joined to define said housing; one of said shell parts facing toward said engine; and, said jet pipe being formed onto said one shell part.

26. The exhaust gas murfler of claim 24, said jet pipe defining a wall of a predetermined length and said wall having at least one further air inlet opening along said length.

27. The exhaust gas muffler of claim 24, wherein the portable tool includes means for supplying a flow of engine cooling air; and, said muffler further comprising means for directing at least a portion of the engine cooling air to said jet pipe; and, said jet pipe including inlet means for receiving said portion of engine cooling air in said flow direction.

28. The exhaust gas muffler of claim 24, wherein the engine includes an engine cooling fan for generating a stream of engine cooling air for cooling the engine; and, said muffler further comprising means for directing at least a portion of the engine cooling air to said jet pipe; and, said jet pipe including inlet means for receiving said portion of engine cooling air in said flow direction.

* * * * *